Patented Apr. 3, 1923.

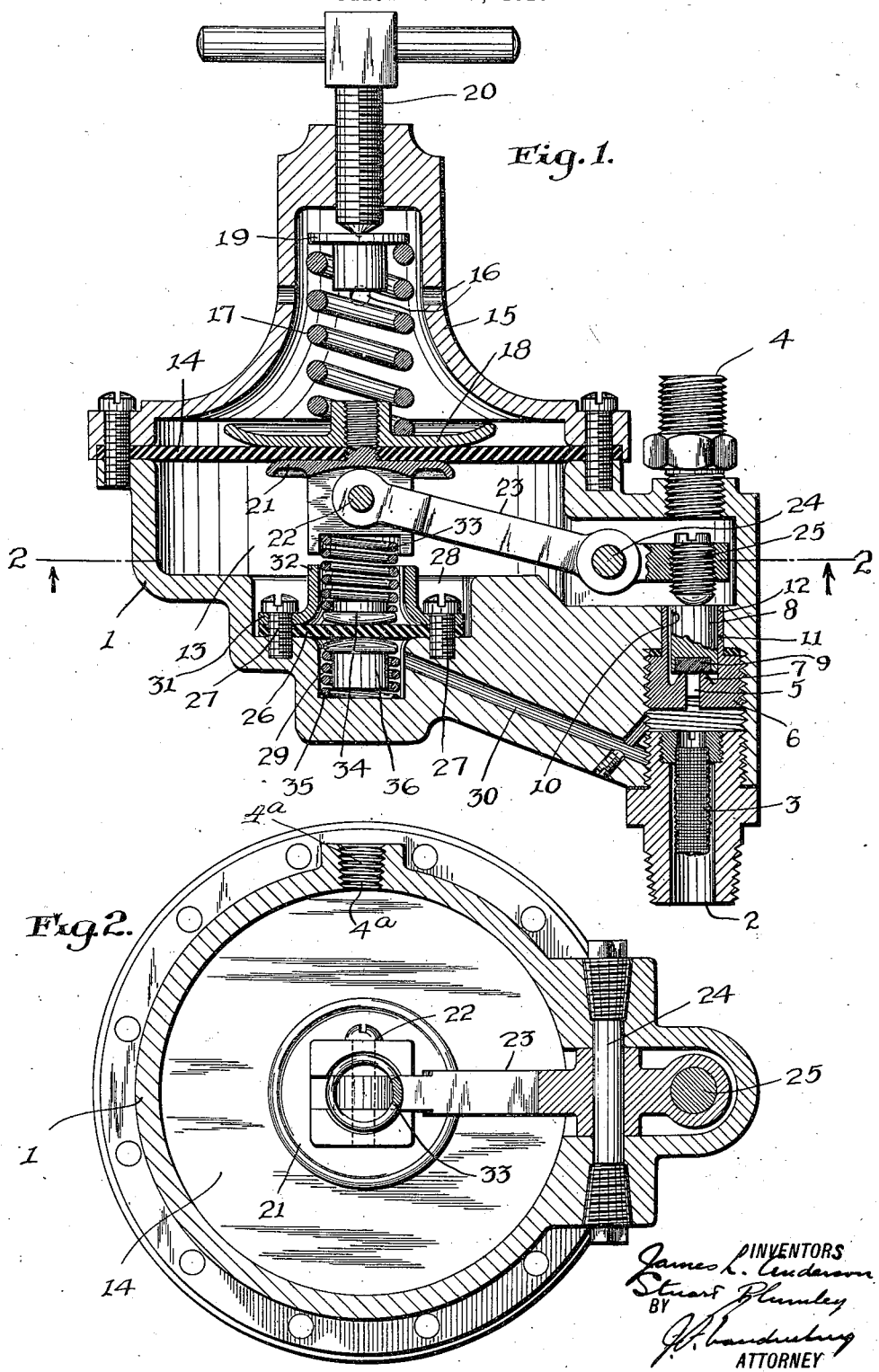

1,450,236

UNITED STATES PATENT OFFICE.

JAMES L. ANDERSON, OF BAYONNE, AND STUART PLUMLEY, OF WESTFIELD, NEW JERSEY, ASSIGNORS, BY MESNE ASSIGNMENTS, TO AIR REDUCTION COMPANY, INCORPORATED, OF NEW YORK, N. Y., A CORPORATION OF NEW YORK.

PRESSURE REGULATOR.

Application filed October 7, 1918. Serial No. 257,138.

*To all whom it may concern:*

Be it known that we, JAMES L. ANDERSON and STUART PLUMLEY, citizens of the United States, and residents, respectively, of Bayonne, in the county of Hudson and State of New Jersey, and of Westfield, in the county of Union and State of New Jersey, have invented a new and useful Pressure Regulator, of which the following is a specification.

The object of the invention is to provide a pressure-regulator which when connected at some point between a source of fluid pressure and a point of use, will reduce the pressure to a desired value at the reduced pressure side and hold it substantially at that value even though the pressure at the source side may change. Ordinary gas-pressure-regulators, the action of which is dependent upon a diaphragm at the reduced-pressure side operate to keep this reduced pressure uniform irrespective of the rate of consumption at the point of use. In addition, however, there may be variations in pressure at the source side of the regulator. For cases where the source pressure is high, that is to say where there is a decided disparity between the pressure to be reduced and the pressure to be delivered, these variations do not materially affect the functioning of the regulator. Where, however, the source pressure is moderate or low, and the difference between it and the delivery pressure is not great, the ordinary regulators have proved unsatisfactory. Thus, for example, when used in a distributing system between one or more acetylene generators, operating, say, under pressures from 9 to 12 pounds, and an oxyacetylene welding torch requiring acetylene pressures on the order of 3 to 6 pounds, it has been found that changes of a pound or so in the line result in substantial, though lesser, variations in the delivery branch; these variations being sufficient to alter the character of the welding flame and seriously to impair the weld.

Consideration indicates that regulators of the ordinary type are in fact proportional pressure reducers. The present invention makes use of two diaphrams which act in conjunction upon the valve member of the regulator, in such manner as to hold the reduced pressure steady when changes occur at the source. In addition, it performs the regular function of compensating for changes in consumption. One of these diaphragms is disposed at the reduced pressure side of the regulator valve, after the ordinary manner, while the other, which may be called an auxiliary diaphragm, is placed so as to be exposed to the source pressure. The accompanying drawing shows an auxiliary diaphragm much smaller than the main or ordinary diaphragm and interposed between the inlet and outlet pressures.

In the said drawing:

Fig. 1 is an axial section through the regulator; and

Fig. 2 is a horizontal section on the line 2—2 of Fig. 1.

For convenience the terms "inlet pressure" and "inlet side," will be used instead of "source pressure" and "source side," and "outlet pressure" and "outlet side" in place of "reduced pressure" and "reduced pressure side."

The body or case 1 of the regulator is made of suitable shape and size. Gas from a source or line enters at the inlet 2, where it is obliged to pass through a screen 3. The exit for the gas after having its pressure lowered to the desired value is indicated at 4, the inlet and outlet being preferably in alinement at one side of the main axis. A screw-threaded opening 4ᵃ is provided for the attachment of a gage.

From the inlet the gas flows through a passage 5 in a bushing 6, which is screwed into a cavity in the inlet portion of the body. A circular seat ridge 7 is formed in this bushing at the outlet end of said passage, to cooperate with a plug-like valve member 8 having a casenite or other seating insert 9. This valve member is slabbed off at one or more sides, as indicated at 10, to permit the passage of gas when it is separated more or less from its seat; and in these movements it is guided in an enlarged coaxial counterbore 11 in an extension 12 of the bushing at the low or reduced pressure end of the passage 5.

After passing the valve, the gas enters the large outlet chamber 13, where it presses upon a diaphragm 14 forming a wall of this chamber and suitably clamped between the main body and a bonnet 15, the interior of which latter is open to the atmosphere through openings 16. A regulating spring 17 in the bonnet is held under compression between an abutment disk 18 secured to the diaphragm and an abutment button 19, which bears against the usual adjusting screw 20.

Another abutment 21 secured to the diaphragm at the opposite side receives a pivot 22 which holds the end of the long arm of a two-armed lever 23, having a pivot fulcrum at 24. The short arm of this lever carries a contact screw 25 with a rounded end working upon the top of the valve member 8.

Considering only the parts already described, it will be perceived that a slight increase in pressure at the outlet side, due to lessened consumption, will flex the diaphragm 14 against the resistance of the spring 17, with the effect of causing the valve to move nearer its seat, thereby restricting the area through which the gas may flow, and preventing the said increase in outlet pressure exceeding a very small value. This diaphragm, if used alone, would also respond to an increase in outlet pressure due to a rise in the inlet pressure, but this response would be imperfect. It would keep the pressure in the chamber 13 from rising as much as it otherwise would, but it would not prevent it increasing substantially in proportion to the increase in source pressure. Conversely, a decrease in consumption, causing a slight lowering at the outlet side, will permit the diaphragm to yield somewhat under the spring, and this will result in the valve receding from its seat, so that the pressure in the chamber 13 will not be allowed to drop materially. For a decrease in inlet pressure, however, the diaphragm would compensate only partly.

By combining with this diaphragm a smaller or auxiliary diaphragm 26 subject to the inlet pressure, an altogether different result is secured, that is to say, the outlet pressure will be preserved substantially at the value determined by the adjustment of the screw 20, regardless not only of variations in consumption, but also of increase or decrease of pressure at the source.

This auxiliary or high pressure diaphragm is preferably clamped by screws 27 upon an annular ledge or rabbet, between two recesses 28 and 29 of different diameters at the bottom of the chamber 13 and coaxial with the diaphragm 14, where it forms a flexible wall between the outlet chamber 13, which is a region of lower pressure, and a chamber 29, which is part of the inlet or pressure side of the regulator, the latter chamber being connected with the inlet by a drilled passage 30. The auxiliary diaphragm is clamped in a gas-tight manner by the screws 27, acting through an annular flange 31 upon a tubular spring guide and stop 32, which is held by these screws in position in the outlet chamber 13. A spring 33 confined under compression in this guide and in a socket in the abutment 21, its lower end bearing upon the auxiliary diaphragm through the intermediary of a button 34, serves both as a means to support the diaphragm 14 against sagging and as a flexible interconnection with the valve-operating connection or lever 23.

Another spring 35 under compression in the chamber 29 and having a button 36 whereby it presses upon the auxiliary diaphragm, supports this diaphragm against the pressures of the springs above, and also acts with the spring 33 to support the main diaphragm against sagging.

An important function of the springs 33 and 35, and particularly of the spring 33, is to close the valve when pressure is taken off the regulating spring 17, by fully unscrewing the hand screw 20. In connection with torches for which the regulator is particularly suitable it is desirable to be able to use the regulator as a shut-off valve when the torch is not in use. In that event the operator will leave the torch valves open and unscrew the oxygen and acetylene regulator screws. This will close off the flow at the regulators and keep pressure off the hose leading to the torch, provided there are springs beneath the diaphragms which will close the regulator valves. This the springs 33 and 35 will do, or the spring 33 alone will perform the function as long as the auxiliary diaphragm is supported by the inlet pressure.

The spring 35 could be dispensed with, if the chamber 29 were made shallow enough to support the diaphragm 26 in event of the support of the inlet pressure failing or being removed, but in that event the action of the regulator would be less sensitive. Similarly the spring 35 might be substituted by some other, non-compensating connection, at the expense of exactness of regulation.

The design in respect to these springs, it will be understood, is such that under working conditions the regulating spring 17 will be superior to the supporting springs and will flex the diaphragms in opposition thereto when the gas pressures permit. We do not limit ourselves in respect to the springs, or to the other precise features of construction illustrated. The diaphragms which we prefer to employ are those having no resilience in themselves, but diaphragms possessing spring properties may also be used, and in the latter event the spring of the diaphragms may act either with or against the gas pressures, and either with or without the support of external springs. In the construction illustrated it will be noted that the valve member opens under the pressure of the gas, toward the outlet side, and is positively moved in the closing direction by the diaphragms when the latter are energized by the pressure of the gas, and permitted to open when the pressure decreases. This is advantageous, but not necessarily essential.

The essence is the combination of the two diaphragms. The action of the main or outlet pressure diaphragm 14 considered alone has already been described. Whereas this diaphragm acts primarily in response to variations in outlet pressure, the auxiliary diaphragm 26 responds primarily to variations in inlet pressure. A rise in pressure at the inlet, transmitted through the passage 30 beneath this diaphragm flexes the same against the spring resistance above, and through the spring 33 acting as a thrust connection, exerts its influence upon the valve lever, tending to close the valve. Decrease in the inlet pressure, on the contrary, permits the diaphragm to flex in the reverse direction under the spring pressure above and tends to relieve the pressure of the lever upon the valve and to permit the latter to be opened by the gas. The two diaphragms acting both independently and conjointly upon the valve maintain the outlet pressure substantially uniform at the value determined by the regulating screw, irrespective of changes in the inlet pressure, which one diaphragm alone will not do. The two diaphragms, it will be observed, act in the same sense with relation to the valve; that is to say, increase in pressure in the outlet chamber pressing upon the diaphragm 14 tends to cause the valve to close, and increase of pressure in the inlet chamber pressing upon diaphragm 26 likewise tends to produce closing; vice-versa, decrease in either or both of the pressures tends to cause the valve to open.

The upper end of the spring guide 32 and the lower end of the abutment member 21 are close enough to each other to abut and take further strain off the diaphragm 14 before the danger point is reached in event of the regulating screw 20 being screwed down as far as it will go. This will also prevent further strain being imposed on the auxiliary diaphragm 26. Or the stem of the button 36 may be designed to bottom in the recess 29 to protect this diaphragm at a certain degree of downward flexure.

While the invention relates more particularly to low or moderate pressure gas-regulators, it is to be understood that we do not limit ourselves in respect to either the pressures or the fluids with which it may be used.

What we claim as new is:

1. A pressure-regulator comprising a suitable casing having inlet and outlet portions and a connecting passage commanded by a valve, a diaphragm subject to the outlet pressure, a regulating spring acting upon said diaphragm in opposition to the outlet pressure, and an operative connection between the diaphragm and the valve, combined with an auxiliary diaphragm subject to the inlet pressure, and a resilient interconnection between the auxiliary diaphragm and the valve.

2. A pressure-regulator comprising a suitable casing having inlet and outlet portions and a connecting passage commanded by a valve, and means controlling said valve comprising two diaphragms subject, respectively, to the outlet and inlet pressures and having an interposed spring, and connections whereby the two diaphragms control the valve member.

3. A pressure-regulator comprising a suitable casing having inlet and outlet portions and a connecting passage commanded by a valve, a diaphragm subject to the outlet pressure, a regulating spring acting upon said diaphragm in opposition to the outlet pressure, and a lever operatively connecting the diaphragm and valve, combined with an auxiliary diaphragm subject to the inlet pressure, and a spring interposed between the diaphragms.

4. A pressure-regulator comprising a suitable casing having inlet and outlet portions and a connecting passage commanded by a valve, a diaphragm subject to the outlet pressure, a regulating spring acting upon said diaphragm in opposition to the outlet pressure, an abutment secured to the diaphragm, and a lever operatively connecting said abutment with the valve, combined with an auxiliary diaphragm subject to the inlet pressure, and a spring interposed between the auxiliary diaphragm and said abutment.

5. A pressure-regulator comprising a suitable casing having inlet and outlet portions and a connecting passage commanded by a valve, a diaphragm subject to the outlet pressure, a second diaphragm interposed between the inlet and outlet pressures, a spring interposed between the diaphragms, a spring supporting said second diaphragm, and means enabling the two diaphragms to control the valve.

6. A pressure-regulator comprising a suitable casing having inlet and outlet portions and a connecting passage commanded by a valve, a diaphragm subject to the outlet pressure, a regulating spring bearing upon said diaphragm in opposition to the outlet pressure, a second diaphragm interposed between the inlet and outlet pressures, a spring interposed between the diaphragms, a spring supporting said second diaphragm, and means enabling the two diaphragms to control the valve.

7. A pressure-regulator comprising a suitable casing having inlet and outlet portions and a connecting passage commanded by a valve, arranged to close against the inlet pressure, combined with two diaphragms, one subject to the outlet pressure and the other interposed between the inlet and outlet pressures, and means resiliently interconnecting the diaphragms and the valve.

8. A pressure-regulator having inlet and outlet portions and valve means commanding communication therebetween, characterized by two diaphragms subject, respectively, to the outlet and inlet pressures, and means resiliently interconnecting the diaphragms with the valve means.

9. A pressure-regulator having a valve commanding a passage between its inlet and outlet, and characterized by two resiliently interconnected diaphragms subject, respectively, to the outlet and inlet pressures, and a valve lever controlleod thereby.

10. A pressure-regulator having a valve commanding a passage between its inlet and outlet, two diaphragms subject, respectively, to inlet and outlet pressure interconnected with said valve, a regulating spring and screw acting upon the diaphragm of the outlet side, and means limiting the flexure of said diaphragm under the action of the screw.

11. A pressure-regulator having a valve commanding a passage between its inlet and outlet, two diaphragms subject, respectively, to inlet and outlet pressure controlling said valve, a regulating spring and screw acting upon the diaphragm of the outlet side, a spring beneath said diaphragm, and a member serving both as a guide for said spring and as a stop to limit the flexure of said diaphragm under the action of the regulating screw.

JAMES L. ANDERSON.
STUART PLUMLEY.